Oct. 25, 1955  E. W. HICKEY  2,721,511
APPARATUS FOR MAKING COFFEE
Filed Dec. 11, 1950  4 Sheets-Sheet 2
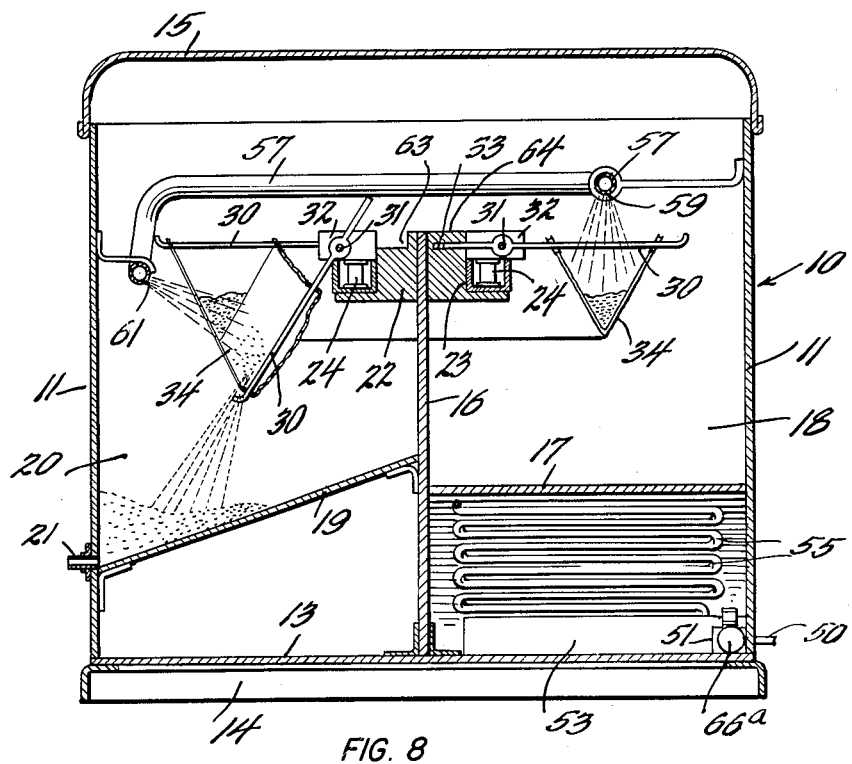
FIG. 8
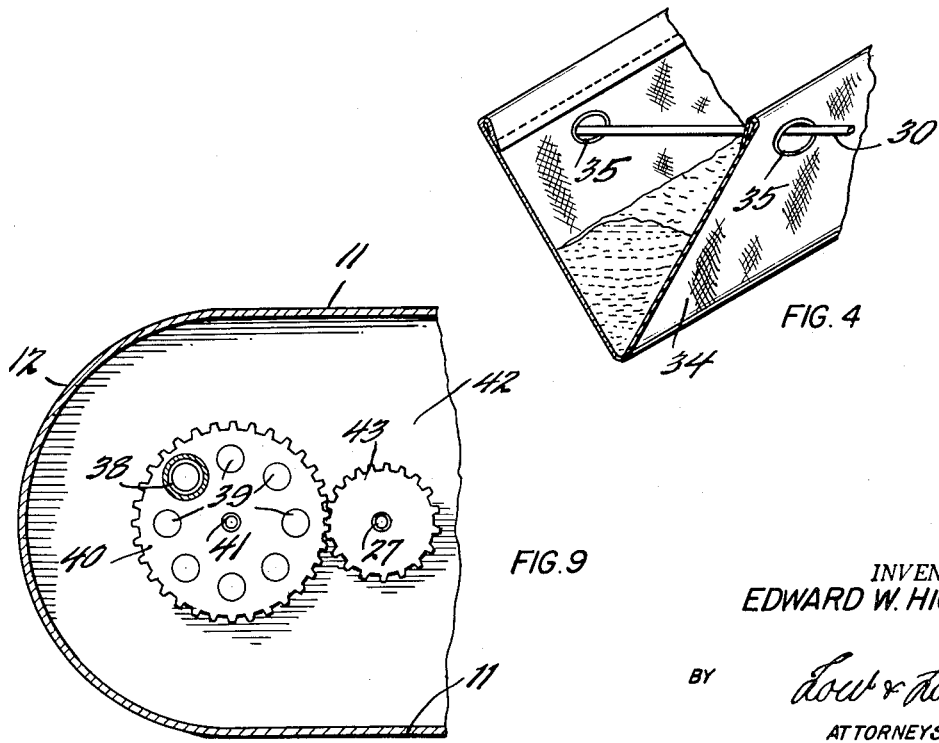
FIG. 4
FIG. 9
INVENTOR.
EDWARD W. HICKEY
BY
Low & Low
ATTORNEYS.

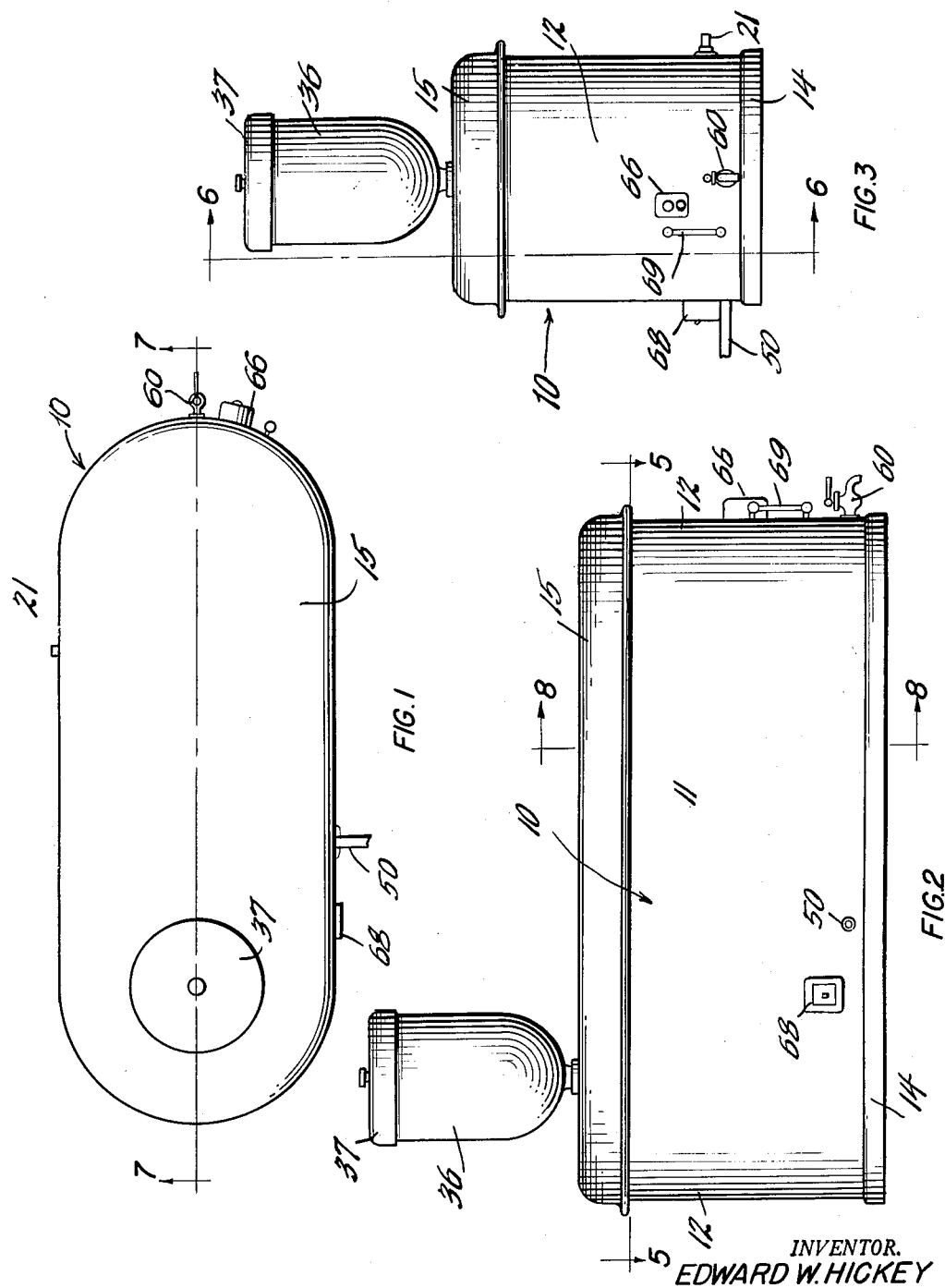

Oct. 25, 1955  E. W. HICKEY  2,721,511
APPARATUS FOR MAKING COFFEE
Filed Dec. 11, 1950  4 Sheets-Sheet 3
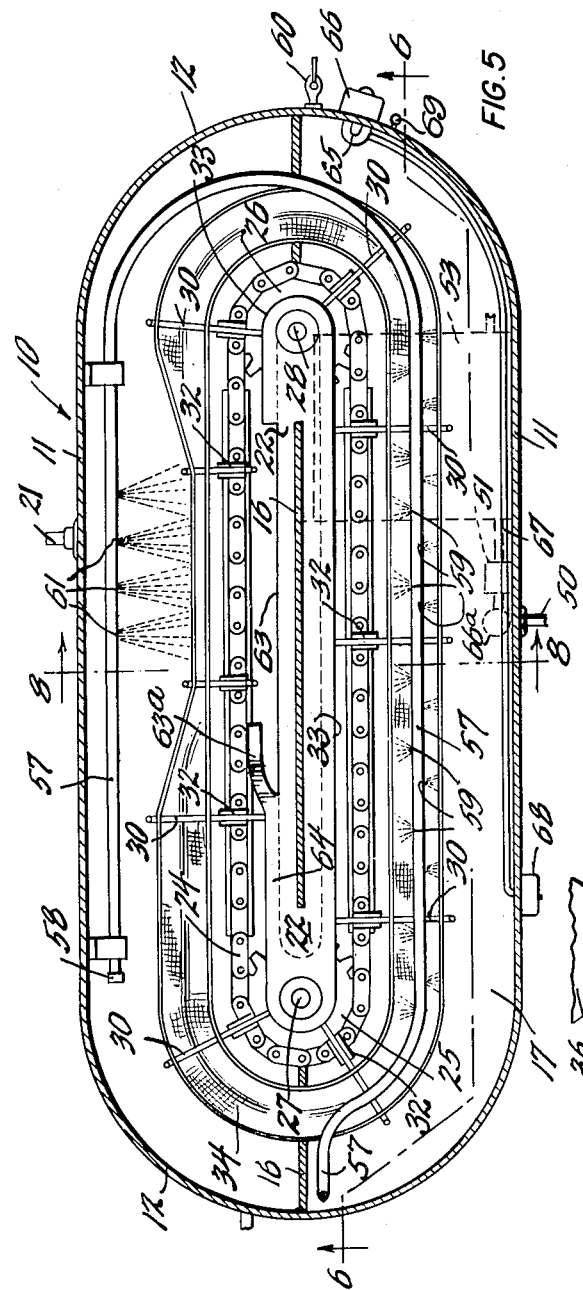
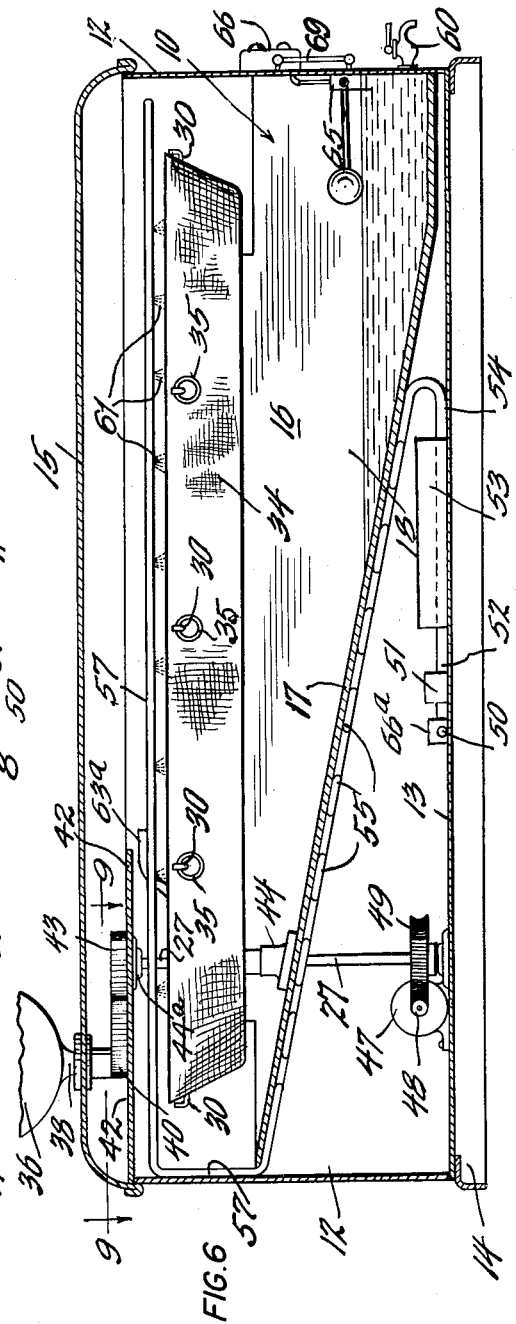
INVENTOR.
EDWARD W. HICKEY
BY *Howe & Howe*
ATTORNEYS.

Oct. 25, 1955  E. W. HICKEY  2,721,511
APPARATUS FOR MAKING COFFEE
Filed Dec. 11, 1950  4 Sheets-Sheet 4
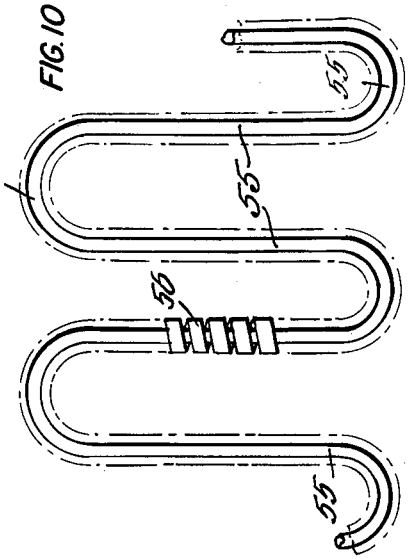
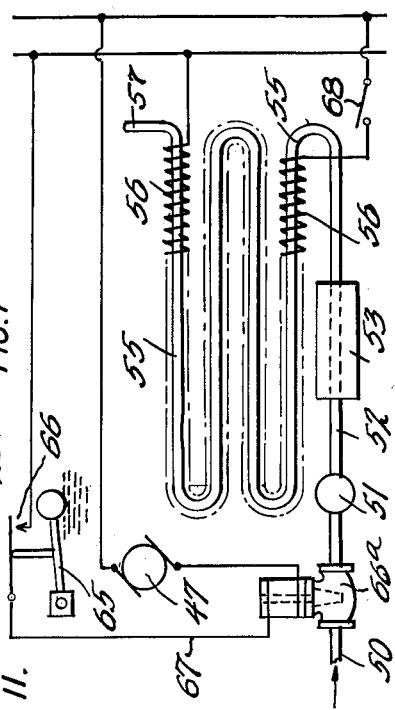
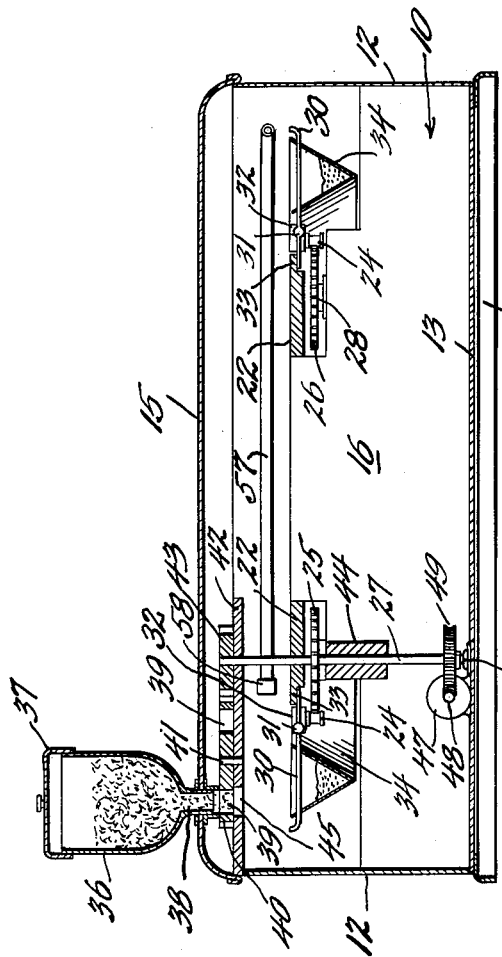
INVENTOR.
EDWARD W. HICKEY
BY
ATTORNEYS.

United States Patent Office 2,721,511
Patented Oct. 25, 1955

2,721,511

APPARATUS FOR MAKING COFFEE

Edward W. Hickey, Baltimore, Md.

Application December 11, 1950, Serial No. 200,247

8 Claims. (Cl. 99—289)

The invention relates to an apparatus for automatically preparing fresh coffee or other hot infused beverage in accordance with requirements therefor, and has for its objects to provide new and useful improvements in apparatus for this purpose.

An important object of the invention is to provide an apparatus for brewing beverages such as fresh prepared hot coffee, by mechanically and automatically controlling the temperature and quantity of the water required, the quantity of pulverized bean or leaf required, and the proper length of time necessary to brew the beverage. In the instance of coffee which is a primary consideration, it is highly desirable to secure the maximum quality and palatability of the beverage, while at the same time utilizing a minimum amount of manual labor, and also to insure against the provision of an over or under supply of prepared beverage.

The invention is of particular utility in hotels, restaurants, clubs and other commercial establishments, wherein large amounts of coffee are commonly required to be prepared within a comparatively short time interval. Prior to the present invention it has been the custom to prepare hot coffee beverage or the like in commercial establishments of the described character, in large urns or in a plurality of well known vacuum coffee makers of individually small volume and capacity. This necessitates frequent replenishment of such urns or receptacles with consequent continuous manual labor and attention. These methods are obviously accompanied by the described inherent disadvantages other than the necessity for considerable manual labor and attention. In the instance of the usual urn of large capacity, the prepared coffee for which there may be no immediate demand, frequently stands to such an extent as to become unpalatable to the taste. Unless the urn is frequently emptied and replenished with attendant expense, the previously brewed coffee is not of a character as to inspire confidence of the customer in the establishment in question.

The present invention contemplates the important consideration of insuring the preparation of adequate quantities and relatively small quantities of fresh coffee as required during slow business hours, while also insuring the provision of sufficient increased quantities of brewed coffee during any sudden rush period as required. The invention is sufficiently elastic in its character to rapidly and automatically increase its volume so as to supply large amounts of brewed coffee for a particular occasion as for dinner or banquet purposes.

Numerous other objects and advantages of the invention will be apparent as it is better understood from the following description, which, taken in connection with the accompanying drawings, discloses a preferred embodiment thereof.

In said drawings:

Fig. 1 is a plan view of a preferred form of the beverage making apparatus.

Fig. 2 is a view in side elevation of the same.

Fig. 3 is an end elevation of the apparatus as viewed from the right hand of Figs. 1 and 2.

Fig. 4 is an enlarged fragmentary detail view in perspective and illustrating the structural character and trough-like configuration of the ground coffee retaining bag embodied in the apparatus or machine.

Fig. 5 is an enlarged horizontal sectional view taken substantially on line 5—5 of Fig. 2.

Fig. 6 is a vertical longitudinal section partly in elevation, and taken substantially on lines 6—6 of Figs. 3 and 5.

Fig. 7 is a view similar to Fig. 6, partly schematic in character and taken on line 7—7 of Fig. 1.

Fig. 8 is an enlarged transverse section taken substantially on line 8—8 of Fig. 5.

Fig. 9 is a horizontal sectional detail taken substantially on line 9—9 of Fig. 6.

Fig. 10 is a fragmentary detail view of a portion of the water heating coil and associated electrical heating unit therefor, and Fig. 11 is a schematic view including a wiring diagram, illustrative of the automatic electro-mechanical operation of the apparatus.

Referring to the drawings, the instant apparatus comprises an elongated self-contained portable unit including a casing 10 having opposed side walls 11, curved end walls 12 and an imperforate bottom wall 13, secured to or mounted upon a rigid base member 14 of generally conforming configuration. The casing 10 is open at its top to provide convenient access to its interior and is provided with a removable hinged or other separable cover member 15.

A central longitudinally extending upstanding partition wall 16 extends from end to end of the casing and divides the interior thereof into two separate longitudinal chambers or compartments sealed from communication with each other. One of these compartments is provided with an inclined imperforate floor 17 of metal or the like, constituting a liquid coffee receiving reservoir 18 (Figs. 6 and 8). An outwardly and downwardly inclined floor 19 is provided on the opposite side of the central partition 16 to constitute this locality a waste coffee receiving chamber or sump 20 having a valve controlled outlet 21 which may communicate with any appropriate drain or receiver for waste liquid and solid coffee material.

The upper end of the central partition wall 16 is designed to rigidly support a longitudinally extending elongated bracket member 22 which is cut away around its periphery as at 23 (Fig. 8) to constitute a seat or track for an endless flexible bag support member, illustrated as constituting a chain 24. Opposite ends of the endless chain member are entrained about sprocket wheels 25 and 26 respectively mounted on a vertical drive shaft 27 and an idler shaft 28. As best viewed in Fig. 7, drive shaft 27 is journaled at its upper end in the bracket member 22 and at its lower end in a suitable bearing 29 on the base or bottom wall 13. Shaft 28 which carries sprocket 26 may constitute a jack or stud shaft journaled in suitable bearings carried by the central partition wall 16 or by bracket member 22 (Fig. 5).

Endless chain 24 carries a plurality of spaced outwardly projecting rod elements 30, each having a pivotal mounting 31 on suitable block members 32 carried at spaced intervals by the chain 24. The inner ends of said rods are designed to slidably engage an endless cam track 33 disposed on the periphery of the elongated bracket member 22. Thus the pivotally mounted rod members are normally held in substantially horizontal position as viewed in Fig. 7 during the major portion of their travel within the interior of the casing 10.

The rod members 30 are designed to removably support and advance with the chain an endless porous conveyor bag 34 preferably constructed of canvas or other suitable cloth material. As best seen in Fig. 4 the endless porous cloth conveyor bag 34 is of trough-like configuration and of substantial V-shape in cross section and is provided at spaced intervals therealong with opposed open eyelets 35 through which the outer ends of the rod elements 30 are projected to support the bag in depending position for travel with the chain, while permitting convenient removal of the bag from the rods for replacement or cleaning purposes.

A container or hopper 36 for the ground or pulverized coffee is mounted on the cover member 15 adjacent one end of the casing 10 and is provided with a removable cover 37. The lower end of the hopper terminates in a restricted neck or nozzle 38 which communicates through an aperture in cover 15 with one of a plurality of circumferentially spaced pockets 39 of a gear wheel or member 40 having a journal mounting 41 on an elevated horizontal fixed table or bracket member 42. The pocketed gear meshes with and is designed to be driven by a second gear member 43 fixed on the upper end of vertical drive shaft 27. Said shaft 27 is or may be journaled intermediate its extent in a bearing 44 on the inclined floor or partition wall 17 within the casing (Fig. 6), and also in a bearing 44a on the elevated bracket member or table 42.

As best seen in Figs. 6 and 7 an electric motor 47 within the casing 10 is designed to drive a worm 48 on its armature shaft through a suitable reduction gearing unit (not shown). Worm 48 meshes with a worm wheel 49 on shaft 27 for driving the latter at a predetermined speed of travel. Said shaft 27 drives intermeshing gear elements 43 and 40, as well as sprocket wheel 25 for driving the endless flexible chain 24 and its supported endless conveyor bag 34.

A single discharge outlet or aperture 45 (Fig. 7) is provided in the bracket member 42 and is designed for registry with successive pockets 39 of gear wheel 40 as the latter is slowly continuously or intermittently revolved beneath the coffee hopper discharge nozzle 38.

From the foregoing it will be apparent that when motor 47 is energized to drive shaft 27, successive increments of coffee or other ground commodity for the infused beverage will be deposited in the pockets 39 of gear wheel 40, and thence discharged by gravity through outlet aperture 45 in bracket 42. Thence these successive ground coffee increments are deposited in the V-shaped traveling conveyor bag 34 as the latter is driven in time with the rate of coffee discharge, by drive sprocket 25 on shaft 27.

The water supply for preparing the coffee from the pulverized beans received from hopper 36 is admitted from a suitable source through the inlet pipe 50 at one side of the casing 10, and thence passes through a pressure reducing valve 51 (Figs. 5, 6 and 11). A pipe 52 conducts the cold water to a preheating tank 53 which may have a capacity of approximately one gallon, and which may be electrically or otherwise heated through suitable coils therewithin, or by exterior means such as a gas burner, not shown. The preheated water is thence conducted by pipe or conduit 54 through a series of coils 55 located directly beneath the inclined imperforate floor 17 within the casing 10. A flexible coiled electrical heating unit designated by the numeral 56 in Fig. 10 serves to raise the preheated water in the coil to the desired temperature of approximately 210° Fahr. before it is placed in contact with the ground coffee increments being progressively advanced in a continuous endless path of travel by conveyor bag 34. The hot water from the electrically heated coil 55 is conducted by pipe 57 to immediately above the conveyor bag 34 (Figs. 5 and 6), said hot water pipe 57 preferably being closed at its outer end as indicated at 58.

During passage of the conveyor bag 34 along one side of the apparatus or casing 10, the lower side as viewed in Fig. 5, the hot water from pipe 57 is continuously sprayed into the bag 34 through a series of spaced spray nozzles or orifices indicated at 59. This hot water is impinged directly upon the predetermined ground coffee increments contained within the bag, and the resulting hot coffee beverage seeps or drips and is strained through the bag into the receiving reservoir 18 as best illustrated in Fig. 6. This prepared coffee accumulates by gravity at one end of the inclined reservoir 18 from whence it may be manually dispensed into cups as desired through the usual faucet valve 60. The pressure of the hot water at the spray nozzles 59 may be controlled as desired through the described pressure regulating valve 51 within the casing and through which the fresh or cold water for the beverage is admitted through inlet pipe 50.

The spent coffee grounds in the conveyor bag 34 are advanced from registry with the final hot water spray nozzles 59 towards the opposite side of the apparatus, at which time the conveyor bag is flattened and twisted or turned into substantially vertical position, as best seen in Figs. 5 and 8. This serves to release and deposit the spent coffee grounds into the waste coffee receiving chamber or sump 20. At this time hot water from additional spaced or aligned spray nozzles or orifices 61, in and near the terminal end of water supply pipe 57, is impinged upon the canvas or other porous conveyor bag to wash the waste coffee grounds from the bag and into the sump. This waste water together with the coffee grounds may be removed as desired from the receiving chamber 20 by means of the valve-controlled outlet port 21.

At the waste coffee discharge side of the apparatus or casing, the inner ends of the moving pivoted bag supporting rod members 30 on chain 24 enter a cut-away portion 63 of the cam track 33. The weight of the bag and its relatively heavy water saturated contents thus serves to elevate the opposite inner ends of said arms while depressing by gravity the outer bag supporting ends of the rods so as to substantially straighten and incline downwardly at this locality, the outer side of the flexible trough-like cloth conveyor bag. This temporary and localized deformation of the bag facilitates emptying of its waste coffee contents, as is best seen in Fig. 8 of the drawings.

Thereafter the elevated inner ends of the bag supporting rod elements 30 are engaged by an upwardly projected inclined cam member 63a on bracket 22 at the terminal end of the cut-away portion 63 of the cam track 33. Said cam member serves to depress successively the elevated inner ends of the pivoted rods 30 to horizontal position and reengage the same with the cam track 33, as will be apparent. This serves to reform and again position the bag 34 into substantial V-shape in cross-section, in readiness for receiving further coffee increments from hopper 36 as the bag again passes in registry beneath the latter and the revolving coffee discharge gear wheel 40.

The invention contemplates an automatic control of the amount of liquid coffee continuously prepared in the apparatus, to the end that the prepared liquid coffee or other infused beverage received in reservoir 18 will not unduly accumulate and stand, with the result of losing its fresh taste and thereby becoming unpalatable. This is best accomplished by providing an automatic float controlled valve 65 (Figs. 5 and 6) at one end of the casing and on the interior of the coffee receiving reservoir 18. When the prepared beverage in reservoir 18 reaches a predetermined level, float valve 65 is actuated to operate an electrical switch 66 on the casing.

As best seen in Fig. 5 and in the wiring diagram of Fig. 11, the switch 66 is connected by two-way electrical conduit 67 to an electrically actuated motor switch 68 on the exterior of the casing. Switch 68 is also designed to be manually closed when it is desired to start the apparatus in operation. Automatic opening of switch 68 as described de-energizes the motor 47 with the result that automatic feed of ground coffee to the conveyor bag 34, as well as advancement of the latter by endless chain 24, is temporarily discontinued. An electrical connection 67 from float-controlled switch 66 to a solenoid controlled valve 66a (Fig. 11) is also preferably provided, so as to close this valve and shut off the supply of water to the apparatus. A similar electrical connection from float controlled switch 66 to preheating tank 53 and electrical heating coil unit 56 is not illustrated but may be employed if desired to shut off current to these units. However it may be preferable to maintain electrical current to the water heating coil unit 55 in order to preserve the prepared liquid beverage in reservoir 18 at the proper palatable drinking temperature until dispensed through faucet 60.

It will be understood that after a sufficient amount of prepared coffee has been drawn off for consumption at faucet valve 60 with a consequent depletion of the amount of coffee in the reservoir, float valve 65 will be automatically actuated to close the described interconnected switches to again energize motor 47 and automatically start the apparatus in operation in the manner explained, for the preparation of more coffee to be received in reservoir 18.

In this described manner it will be apparent that fresh hot liquid coffee or other infused beverage is prepared only in accordance with the demand therefor, with insurance that an excessive amount of the beverage will not accumulate and remain standing in the receiving reservoir 18. By the same token in the event the demand for the hot freshly prepared beverage is large and in considerable volume at faucet valve 60, the apparatus is maintained in continuous operation for the preparation of further fresh coffee as long as this demand is in evidence. In this manner an ample supply of fresh prepared coffee is always on hand in an amount commensurate with and not exceeding the demand therefor.

A sight gauge 69 may be provided on the exterior of the casing adjacent the coffee receiving reservoir 18 to visually indicate the amount of prepared coffee contained therein.

The apparatus has been described as designed for continuous operation or movement of the bag supporting conveyor 24 and ground coffee dispensing apparatus for the conveyor bag 34. The apparatus is equally capable of intermittent operation, if desired, and this may be obtained by providing a Geneva movement unit of well known construction between the motor 47 and main vertical drive shaft 27. The inclusion of such an intermittent movement would result in a step by step coffee dispensing and bag movement of an intermittent or pulsating character within the closed casing 10.

At no time is there an excessive amount of hot liquid coffee standing in reservoir 18. This insures the desired quality and taste of the beverage when it is drawn off for consumption.

The described demountable support of the porous conveyor bag 34 on the spaced pivoted conveyor rod members 30 provides a convenient manner for quickly removing the bag from the conveyor supports when desired for cleaning or replacement purposes.

Also it will be apparent that the electrical heating means 56 for the water in coil 55 beneath the inclined floor 17 of the coffee receiving compartment, may be of any desired regulated intensity so as to heat the water in the coil to a predetermined degree for most practical and efficient coffee making purposes.

It is thought that the invention and many of its attendant advantages will be understood from the foregoing description, and it will be apparent that various changes may be made in the form, construction and arrangement of parts of the apparatus mentioned herein, without departing from the spirit and scope of the invention or sacrificing all of its material advantages, the apparatus hereinbefore described being merely a preferred embodiment thereof.

What is claimed is:

1. Apparatus for making hot infused beverages, comprising a housing having a liquid beverage receiving compartment therein, an endless flexible member movable within said housing and having means for driving the same, means for supporting said flexible member for movement in a horizontal plane within said housing, bag mounting means carried by and movable relative to said flexible member, an endless flexible porous bag of trough-like configuration removably carried by said bag mounting means, means disposed above said bag for admitting successive increments of dry beverage material to said bag, means for admitting spaced sprays of heated water to said moving bag to infuse the dry beverage material advanced thereby, the resulting liquid infusion passing through the bag into said receiving compartment, and means on said supporting means cooperating with said bag mounting means to permit tilting of said bag after the infusing operation to discharge the spent solid beverage material therefrom.

2. An apparatus for continuously making coffee, comprising a closed elongated casing having a liquid coffee receiving compartment and a segregated waste coffee material receiving chamber therein, a fixed bracket member in said casing and having a peripherally disposed trackway thereon, an endless flexible member having pivoted supports thereon mounted for movement in a horizontal plane in said trackway, an endless flexible porous bag carried by said supports, said bag being open at its upper end for the major portion of its travel, means for progressively discharging successive increments of dry coffee into spaced localities of the moving bag, means for moving said flexible member with said bag, means for admitting water to said casing, means in said casing for heating the water, spaced spray nozzles for impinging the heated water into said bag into contact with the advancing increments of dry coffee therein to infuse the coffee and thence filter the liquid infusion through said bag into said receiving compartment, cam means on said bracket member engageable with said bag supports for normally holding the bag in coffee receiving and infusion position, said cam means being releasable from said supports to permit the weight of the bag and its contents to tilt the bag into inclined discharge position, and spray means for washing the spent coffee from said tilted bag into said waste receiving chamber.

3. An apparatus for continuously making coffee, comprising a closed elongated casing having a liquid coffee receiving compartment and a segregated spent coffee receiving chamber therein, a fixed bracket member in said casing and having a peripherally disposed trackway thereon, an endless flexible member having pivoted supports thereon mounted for movement in a horizontal plane in said trackway, an endless flexible porous bag carried by said supports, said bag being of trough-like configuration and of substantial V-shape in cross section and open at its upper end for the major portion of its travel, means for progressively feeding successive increments of dry ground coffee by gravity into said bag, means for driving said flexible member and for actuating said coffee feeding means in timed relation, a pressure valve controlled conduit for admitting water to said casing, a tank in said casing for preheating the water, an electrically heated coil in said casing for elevating the temperature of said preheated water to a predetermined degree, spaced spray nozzles for impinging the heated water into said bag into contact with the advancing increments of dry coffee therein to infuse the coffee for subsequent filtration of the liquid infusion through said bag into said receiving compartment, cam means on said bracket member engageable with said bag supports for normally holding the bag in coffee receiving and infusing position, said cam means being releasable from said supports to permit the weight of the bag and its contents to temporarily tilt the bag into inclined discharge position during a portion of its advancement, and spray means for washing the spent pulverized coffee material from said tilted bag into said receiving chamber.

4. An apparatus for continuously making coffee, comprising a closed elongated casing having a liquid coffee receiving compartment and a segregated spent coffee receiving chamber therein, a fixed bracket member in said casing and having a peripherally disposed trackway thereon, an endless flexible member having pivoted supports thereon mounted for movement in a horizontal plane in said trackway, an endless flexible porous bag of trough-like configuration removably carried by said supports, said bag being open at its upper end for the major portion of its travel, means for progressively feeding successive increments of dry ground coffee into said bag, means for driving said flexible member with said bag in timed relation to the actuation of said feeding means, a pressure valve controlled pipe for admitting water to said casing, means in said casing for heating the water, spaced spray nozzles for impinging the heated water onto said bag into contact with the advancing increments of dry coffee therein to infuse the coffee for seepage through the bag into said said coffee receiving compartment, cam means on said bracket member engageable with said bag supports for normally holding the bag in coffee receiving and infusing position, said cam means being releasable from said supports to permit the weight of the bag and its contents to tilt the bag into inclined discharge position, spray means for washing the spent coffee from said tilted bag into said receiving chamber, and means responsive to the coffee liquid level in said receiving chamber for actuating said driving means to control the movement of said flexible member and the actuation of said coffee feeding means.

5. In a coffee making apparatus, the combination of an elongated closed casing having a longitudinal partition wall dividing the interior of the casing into a liquid coffee receiving compartment and a waste coffee chamber, an elongated horizontal bracket disposed above said partition wall and having a peripheral trackway thereon, an endless flexible bag support slidably movable in said trackway and having means for driving the same in an endless path of travel, said support having a plurality of bag carrying rods movably mounted at spaced intervals therealong, an endless porous flexible bag of trough-like configuration having spaced apertures therein for the reception therethrough of said rods to engage the bag for advancement thereof by said bag support, means on said bracket engaging the inner ends of said rods for normally maintaining the bag in upright coffee receiving and making position, means for supplying successive increments of ground dry coffee to said bag, a pipe having spaced spray orifices therein for impinging heated water on the coffee increments in said bag to infuse said increments for subsequent filtration through the bag into said coffee receiving compartment, said rod engaging means on said bracket being further operative to disengage said rods for permitting tilting thereof and the advancing bag carried thereon into an angular position after the coffee infusion making operation, and additional spaced spray orifices in said pipe for spraying water onto the moving tilted bag for washing spent coffee particles therefrom into said waste coffee chamber.

6. In a coffee making apparatus, the combination of an elongated closed casing having a longitudinal partition wall dividing the interior of the casing into a liquid coffee receiving compartment and a waste chamber for spent coffee ingredients, an elongated horizontal bracket supported by said partition wall and having a peripheral trackway therein, an endless flexible bag support movable in said trackway and having means for driving the same in a substantially horizontal plane, said bag support having a plurality of bag mounting rods pivotally mounted at spaced intervals therealong, an endless porous flexible bag of trough-like configuration having spaced apertures therein for the reception therethrough of said rods to removably support the bag for advancement by said support, cam means on said bracket engaging the inner ends of said rods for normally maintaining the bag in upright coffee receiving and making position, means for supplying successive increments of dry comminuted coffee to said bag in time with the advancement of the latter, a pipe having spaced spray nozzles therein for impinging heated water on the coffee increments in said bag to infuse said increments for subsequent seepage through the bag into said coffee receiving compartment, said cam means on said bracket being operative to disengage the inner ends of said rods to permit the weight of the bag and its contents to tilt the rods and the advancing bag supported thereby into inclined discharging position after the coffee infusion making operation, and additional spray nozzles on said pipe for spraying heated water onto the thus inclined bag for washing spent coffee particles therefrom into said waste coffee chamber.

7. In a coffee making apparatus, the combination of an elongated closed casing having a longitudinal partition wall dividing the interior of the casing into a liquid coffee receiving compartment and a waste chamber for spent coffee ingredients, an elongated horizontal bracket supported by said partition wall and having a peripheral trackway therein, an endless flexible bag support movable in said trackway in a substantially horizontal plane, said support having a plurality of bag mounting rods pivotally mounted at spaced intervals therealong, an endless flexible cloth bag of trough-like configuration having spaced apertures therein for the reception therethrough of said rods to removably support the bag for advancement by said support, cam means on said bracket engaging the inner ends of said rods for normally maintaining the bag in upright coffee receiving and making position, rotatable means for supplying successive increments of dry coffee to said bag in time with the advancement of the latter, means for moving said bag support and for rotating said coffee supplying means in timed relation, a pipe having spaced orifices therein for impinging heated water on the coffee increments in said bag to infuse said increments for subsequent passage through the interstices of the bag into said liquid coffee receiving compartment, said cam means on said bracket being operative to disengage the inner ends of said rods to permit the weight of the bag to tilt the rods and the advancing bag supported thereby into inclined discharging position after the coffee infusion making operation, additional spaced orifices in said pipe for spraying water onto the tilted bag for washing spent coffee particles therefrom into said waste coffee chamber, and a valve in said coffee receiving compartment responsive to the liquid level therein for controlling the movement of said bag support and the admission of pulverized coffee increments to said bag.

8. An apparatus for making a hot infused beverage, comprising a closed casing having a liquid beverage receiving compartment therein, an endless flexible member having means for supporting the same within said casing above said compartment for movement in a horizontal path of travel, bag mounting means carried by and pivotally movable relative to said flexible member, an endless flexible porous bag of trough-like configuration removably supported in depending position by said mounting means, means disposed above said bag for admitting successive increments of dry beverage material to said bag in time with its advancement by said flexible member, means for impinging a spray of heated water onto said bag to infuse the increments of dry beverage material advanced thereby, the resulting liquid infusion filtering through the bag into said beverage receiving compartment, and means on said flexible member supporting means periodically engageable with and releasable from said bag mounting means for obtaining tilting movement of said bag in a direction transversely of its horizontal path of travel during further advancement of the bag after the beverage infusing operation to separately discharge the spent solid beverage material from said bag.

References Cited in the file of this patent

UNITED STATES PATENTS

| | | |
|---|---|---|
| 450,094 | Black | Apr. 7, 1891 |
| 1,813,872 | Bausman | July 7, 1931 |
| 1,850,082 | Medin | Mar. 22, 1932 |
| 2,047,172 | Coleman | July 14, 1936 |
| 2,206,424 | Oyen | July 2, 1940 |
| 2,392,452 | Baumann | Jan. 8, 1946 |
| 2,432,759 | Heyman | Dec. 16, 1947 |
| 2,517,073 | Alverez | Aug. 1, 1950 |
| 2,606,697 | Lime | Aug. 12, 1952 |
| 2,619,232 | Parsons et al. | Nov. 25, 1952 |